United States Patent [19]

Okabayashi

[11] Patent Number: 5,485,582
[45] Date of Patent: Jan. 16, 1996

[54] TRANSFER CONTROL UNIT, PROCESSOR ELEMENT AND DATA TRANSFERRING METHOD

[75] Inventor: Ichiro Okabayashi, Osaka, Japan

[73] Assignee: Matsushita Electric Industrial Co., Ltd., Osaka, Japan

[21] Appl. No.: 11,698

[22] Filed: Feb. 1, 1993

[30] Foreign Application Priority Data

Feb. 3, 1992 [JP] Japan .................................. 4-017354
Jan. 7, 1993 [JP] Japan .................................. 5-001151

[51] Int. Cl.$^6$ ........................................ H01J 1/00
[52] U.S. Cl. ........................... 395/250; 395/200.01
[58] Field of Search .......................... 395/250, 425, 395/400, 275

[56] References Cited

U.S. PATENT DOCUMENTS

| | | | |
|---|---|---|---|
| 4,475,155 | 10/1984 | Oishi et al. ............................. | 395/275 |
| 5,089,951 | 2/1992 | Iijima ..................................... | 395/275 |
| 5,109,501 | 4/1992 | Kaneko et al. ......................... | 395/425 |
| 5,202,969 | 4/1993 | Sato et al. .............................. | 395/425 |
| 5,276,850 | 1/1994 | Sakaue .................................. | 395/425 |
| 5,319,764 | 6/1994 | Shimizu ................................. | 395/425 |
| 5,333,290 | 7/1994 | Kato ...................................... | 395/400 |

FOREIGN PATENT DOCUMENTS 0454064 10/1991 European Pat. Off. .
2065938 7/1981 United Kingdom .

OTHER PUBLICATIONS

Okabayashi et al., "Network Structure and VLSI Implementation for a Parallel Computer: Adena", Integrated Circuits and Devices, ICD 89–152, pp. 1–8.

Primary Examiner—Roy N. Envall, Jr.
Assistant Examiner—Paulina Lintsai
Attorney, Agent, or Firm—Willian Brinks Hofer Gilson & Lione

[57] ABSTRACT

At data transfer, a processor sends an address to an address bus and sends a data to a data bus. In a transfer control unit, a comparator compares an outside address signal inputted via the address bus with an inside address signal generated in an address generating part. When the signals coincide with each other, the comparator outputs a coincidence signal. Receiving the coincidence signal, a control part sends a write signal to a buffer and a data on the data bus is stored in the buffer. The address generating part proceeds to a next address according to the write signal. The data in the buffer is sent outside from a port thereafter. Thus, a program for high-speed data transfer is easily programmed with an ordinary code of a processor for general purpose.

8 Claims, 8 Drawing Sheets

TRANSFER CONTROL UNIT, PROCESSOR ELEMENT AND DATA TRANSFERRING METHOD

BACKGROUND OF THE INVENTION

This invention relates to a transfer control unit for controlling data transfer between processors in a parallel processor system or the like, and relates to a processor element and a data transferring method using the same.

Recently, a parallel processor system is focused on as a favorite candidate of a super computer for the next generation. In the parallel processor system, the total performance largely depends on the ability of transferring data between processors, thus a high speed, high performance transfer control unit which controls data transfer is contemplated.

Figure 8:
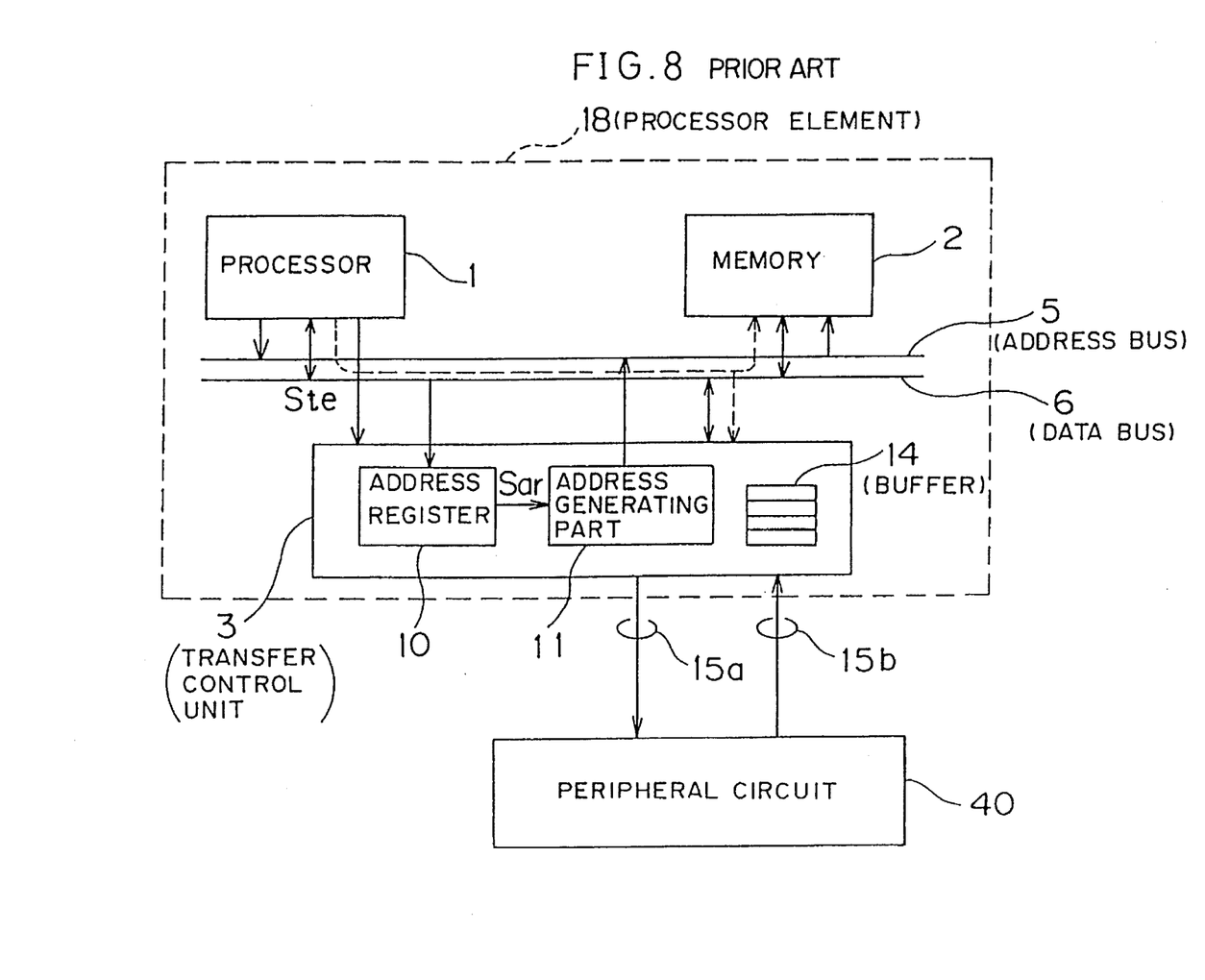
FIG. 8 is a block diagram showing a construction of conventional transfer control unit and processor element.

An example of conventional transfer control unit and processor element is described below, with reference to FIG. 8. FIG. 8 shows a construction of a processor element 18 and a transfer control unit 3 for a parallel processing. The processor element 18 has a processor 1, a memory 2 and the transfer control unit 3. Each of them 1–3 is connected in common to one another via an address bus 5 and a data bus 6. The processor 1 sends out a transfer enable pulse Ste for allowing the transfer control unit 3 to transfer a data.

The transfer control unit 3 includes an address register capable of being set from outside, an address generating part 11 for generating an address according to an output signal Sar From the address register 10, a buffer 14 for temporarily storing input/output data, and output and input ports 15a, 15b for communicating to an external peripheral circuit 40.

An operation of the transfer control unit 3 and processor element 18 with the above construction is explained next. The processor 1 executes a process, while accessing the memory 2 via the address bus 5. When a sequential process is executed, the processor only performs such an operation basically. However, in parallel systems, such an operation cannot be performed smoothly because of frequent communication between the processor element 18 and outside. Therefore, in the parallel systems, usually, the address generating part 11 in the transfer control unit 3 sends out an address to the address bus 5 to access to the memory 2. The data proceeds to the data bus 6, the buffer 14 then to the output port 15a when being sent, and proceeds to the input port 15b, the buffer 14, then to the data bus 6 when being received. As a result, the bus is occupied for the communication with the outside, thus the time for which the processor 1 can use the bus is reduced.

A high speed operation in case the processor element 18 sends a data outside, using a transfer enable pulse Ste is described. The processor 1 sends out the data to the data bus 6 and asserts the transfer enable pulse Ste. Receiving the signal Ste, the transfer control unit 3 fetches the data from the data bus 6 and temporarily stores into the buffer 14, then sends out the data from the output port 15a to the outside thereafter. The data flows in a direction of a broken line.

In this mode, the address generating part is not used basically. When the buffer 14 of the transfer control unit 3 cannot store the data because of being full, or the like, it is required to read the data from the memory 2 thereafter. The address generating part 11 is used in such a case.

Accordingly, memory-write and data sending are carried out concurrently, thus the data bus 6 is effectively used. The above operation is disclosed in the report of the institute of electronics, information and communication engineers (IEICE), Spring Conference 1990, D-110 and the report of IEICE, Integrated Circuits and Devices, ICD 89-152.

With the above construction, however, a hardware for generating the transfer enable pulse is required. Therefore, it is required to design an exclusive processor, or to equip a separate hardware around a processor for general purpose. This means that a processor for general purpose cannot be used without a peripheral hardware. Therefore, a high speed LSI which appears successively to the market cannot be used, which involves a problem upon designing of a system.

This invention has its object of providing a high speed transfer control unit responsive to a processor for general purpose and of providing a processor element using it.

A transfer control unit in this invention comprises: a buffer for temporarily storing data; an address register capable of being written from outside; an address generating part, connected to the address register, for sequentially generating addresses to access based on a value of the address register; a comparator for comparing an address generated in the address generating part with an address inputted from outside to output a coincidence signal when the addresses coincide with each other; and a control part, also referred to as a controller, connected to the comparator, the buffer and the address generating part, for commanding the buffer to store an outside data and commanding the address generating part to proceed to a next address according to the coincidence signal from the comparator.

With the above construction, in the transfer control unit, the comparator compares the inside address generated in the address generator with the outside address inputted from the outside and outputs the coincidence signal when the addresses coincide with each other, and the control part commands the buffer to store the outside data and commands the address generator to proceed to a next address. Accordingly, without the transfer enable pulse inputted from an external circuit, it is possible to transfer a data to the peripheral circuits after the temporarily data storage only by controlling the inside of the transfer control unit, thus performing the high-speed transfer.

The control part in the transfer control unit includes: a counter which is connected to the comparator, which counts coincidence times at receiving the coincidence signal outputted from the comparator, and which is reset to an initial value when it counts up to a preset value; and a signal generating part, connected to the counter, the buffer, and the address generating part, for generating a signal for commanding the buffer to store the outside data and commanding the address generating part to proceed to a next address when the count of the counter reaches to the preset value.

With the above construction, the counter counts the coincidence times when the control part receives the coincidence signal from the comparator. When the count of coincidence signal reaches to the preset value, the signal generating part commands to store the data and to proceed to a next address. Accordingly, the transfer work region is unnecessary even in a case with plural memory accesses at calculation, thus saving the memory.

When the signal generating part is so arranged to be connected to an output side of the comparator, and to command the buffer to store the outside data and command the address generating part to proceed to a next address when count of the counter reaches to the preset value and the signal generating part receives the coincidence signal from the comparator, further high-speed signal process is performed, since the signal generating part commands to store the data and to proceed to a next address when the count of the coincidence times reaches to the preset value and the coincidence signal is received.

A processor element in the present invention comprises a memory, a processor, and a transfer control unit which are connected to one another via a common bus, wherein the transfer control unit includes: a buffer for temporarily storing data; an address register capable of being written from outside; an address generating part, connected to the address register, for sequentially generating addresses to access based on a value of the address register; a comparator for comparing an address generated in the address generating part with an address inputted from outside to output a coincidence signal when the addresses coincide with each other; and a control part, connected to the comparator, the buffer and the address generating part, for commanding the buffer to store an outside data and commanding the address generating part to proceed to a next address according to the coincidence signal from the comparator, and wherein the processor is connected to the comparator of the transfer control unit, outputs an address signal to the comparator and writes a data into an address in the memory accessed by the address generating part.

As a result, data transfer according to the above operation is performed in the transfer control unit according to the memory access signal from the processor via the bus. Therefore, high speed transfer is performed without separately providing a device for outputting a transfer enable pulse and an exclusive processor.

A part of the memory serves as a transfer region, and the processor sets addresses corresponding to the transfer region to the address register of the transfer control unit, and writes a data into the transfer region at a data transfer.

Accordingly, a part of the memory region is used as the transfer region, thus performing high speed transfer and saving the memory.

A method of transferring a data in a transfer control unit in the present invention having a buffer for temporarily storing a data, an address register capable of being written from outside, and an address generating part for generating an address based on a value of the address register, comprises the steps of: comparing an address generated in the address generating part with an address inputted from outside; outputting a coincidence signal when the addresses coincide with each other; and according to the coincidence signal, commanding the buffer to store an outside data and commanding the address generating part to proceed to a next address.

PREFERRED EMBODIMENT OF THE PRESENT INVENTION

FIRST EMBODIMENT

Description is made below about a transfer control unit and a processor element according to the first embodiment of the present invention, with reference to accompanying drawings.

In FIGS. 1–4, a processor element 18 has a processor 1, a memory 2 and a transfer control unit 3, which are connected to one another for communicating via an address bus 5 and a data bus 6.

Figure 1:
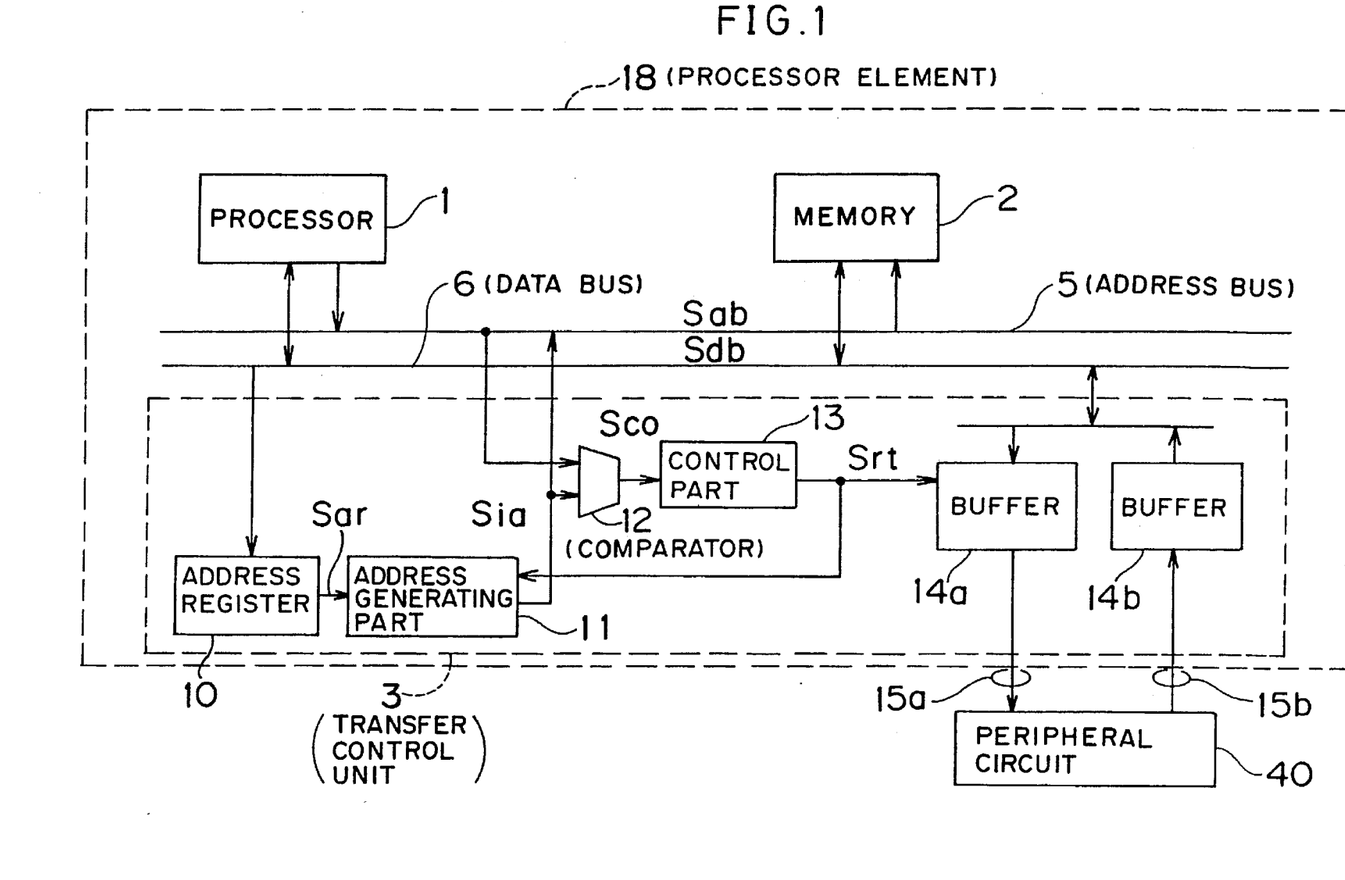
FIG. 1 is a block diagram showing a construction of a transfer control unit and a processor element in a first embodiment.

The transfer control unit 3 includes an address register 10 capable of being set from outside, an address generating part 11 which is connected to the address register 10 and receives an output signal Sat therefrom, a comparator 12 connected to the address generating part 11 for comparing an inside address signal Sia outputted from the address generating part 11 with an outside address signal Sab from the address bus 5, a control part 13 connected to the comparator 12 for controlling the inside according to a coincidence signal Sco from the comparator 12, to output a write signal Srt, buffers 14a, 14b connected to the control part 13 and the data bus 6 for temporarily storing a data, and output and input ports 15a, 15b for communicating to the outside.

Figure 2:
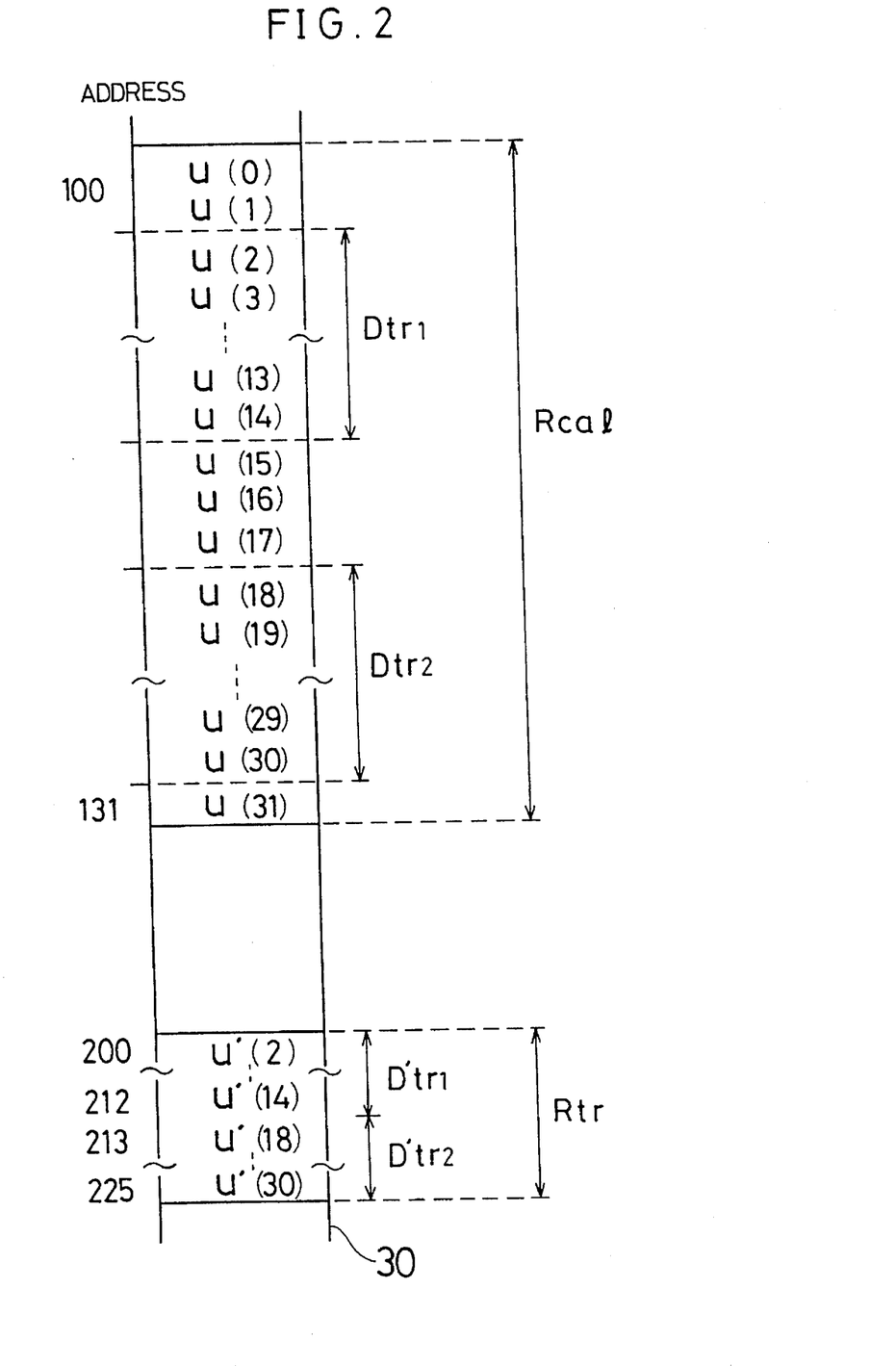
FIG. 2 is a memory map in the first embodiment.

FIG. 2 shows a memory map 30 in the memory 2, wherein addresses 100–131 of the memory 2 are in a calculation region Rcal and addresses 200–225 thereof are in a transfer region Rtr.

Operation of the transfer control unit 3 and the processor element 18 with the above construction is described with reference to FIGS. 1–4.

In FIG. 1, the processor 1 executes a process, while accessing the memory 2. In a sequential system, the processor only performs such an operation basically. In a parallel system, such an operation cannot be performed smoothly because of frequent communication of the processor element to the outside. Therefore, in the usual parallel system, for communication, the transfer control unit 3 accesses the memory 2 by sending the address from the address generating part 11 to the address bus 5. The address is generated according to the setting of the register 10. The data flows as follows:

At sending: data bus 6, buffer 14a, then output port 15a

At receiving: input port 15b, buffer 14b, then data bus 6.

Next described is a high-speed operation in case a data is sent outside of the processor element 18. For efficiently using the data bus 6, the processor 1 writes the data to the memory 2 and sends the data at the same time. In the conventional example (see FIG. 8), this operation is performed according to a transfer enable pulse. The operation in this embodiment is as follows.

Figure 3:
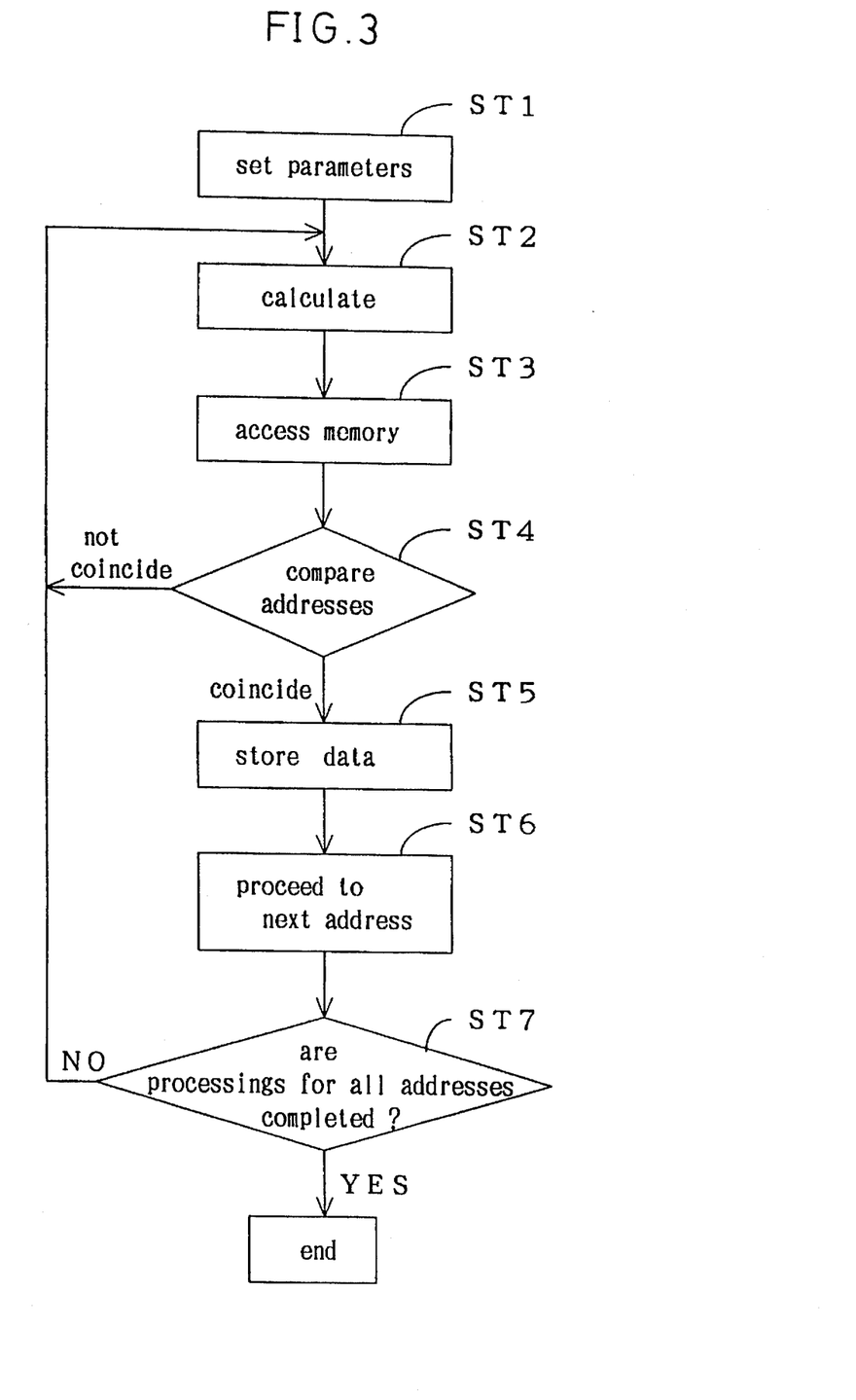
FIG. 3 is a flow chart illustrating a control flow in the first embodiment.

As shown in the flow chart of FIG. 3, at step ST1, parameters for generating an address are set to the register from the data bus 6. In this embodiment, the transfer region Rtr as shown in FIG. 2 is used, therefore the processor 1 sets the transfer control unit 3 to generate addresses 200–225 in order.

The processor 1 executes calculation at step ST2, then sends out an address and a data to the address bus 5 and data bus 6 respectively to access the memory 2 at step ST3.

On the other hand, receiving signals from each bus, the transfer control unit 3 transfers a data and writes a memory at steps ST4–6. In detail, the comparator 12 compares the outside address signal Sab from the address bus 5 with the inside address signal Sia generated in the address generating part 11 at step ST4. When the signals coincide with each other, the comparator 12 outputs a coincidence signal Sco, and the control part 13 receives the coincidence signal Sco to send out a write signal Srt. Then, the data on the data bus 6 is stored into the buffer 14a at step ST5, and at the same time the address generating part 11 proceeds to a next address according to the write signal Srt at step ST6. At step ST7, judged is whether the processings for all addresses to be processed are completed. The control at step ST2 is repeated when the processings for all addresses are not completed, and the control terminates when the processings for all addresses are completed. The data in the buffer 14a is sent outside from the output port 15a thereafter. Accordingly, the data bus 6 is efficiently used since the memory write and the data sending are performed concurrently.

At this time, the memory 2 is used as in FIG. 2. Wherein, FIG. 2 shows an example that the processor 1 executes calculation for an array u(0)–u(31). As described above, a series of addresses 100–131 is set for the calculation region Rcal used. Suppose that data to be transferred in the calculation results are a first data group Dtr1 of u(2)–u(14) and a second data group Dtr2 of u(18)–u(30). The number of the data to be transferred is 26, so that the data are respectively allocated to the addresses 200–225 for the transfer region Rtr. A first transfer data group D'tr1 and a second transfer data group D'tr2 are stored respectively to the addresses 200–212 and the addresses 218–225. The transfer region Rtr may be set beforehand by the processor 1 or the like, or may be determined by the processor 1 at the calculation.

Figure 4:
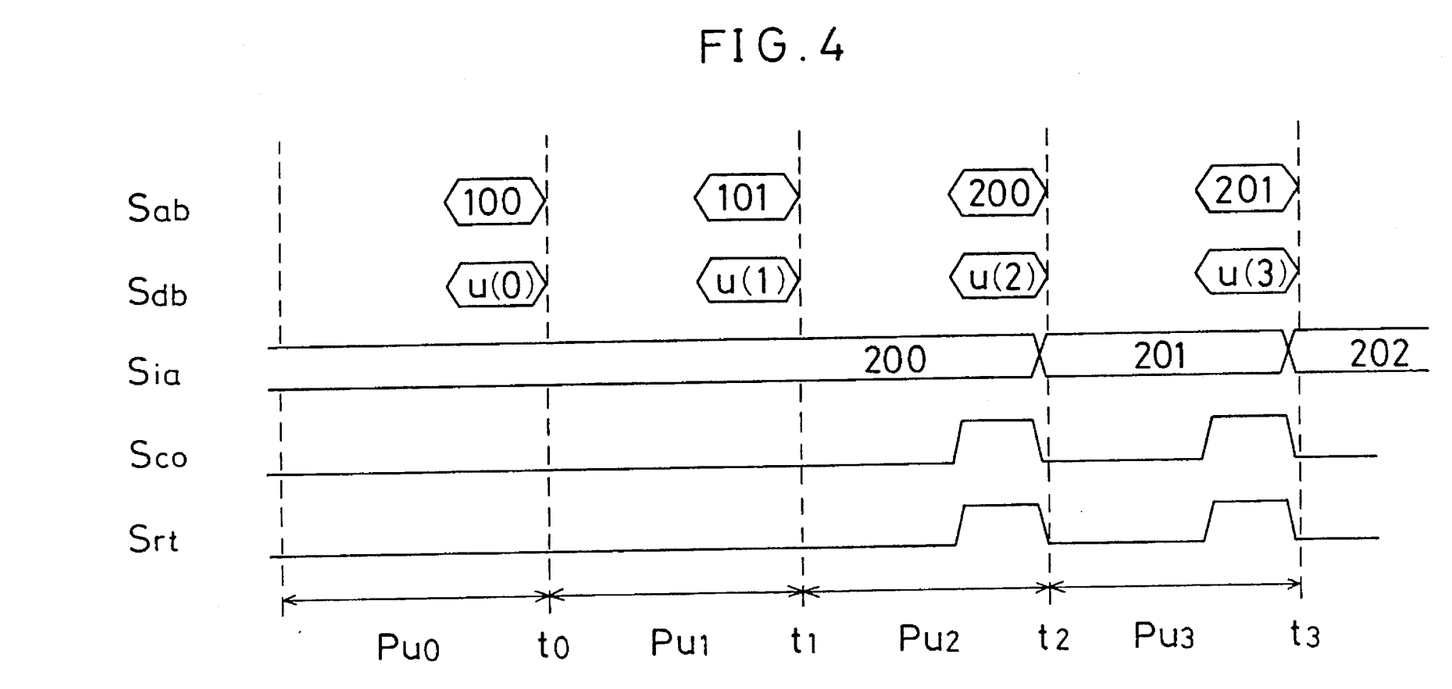
FIG. 4 is a timing chart of each signal in the first embodiment.

An output timing of each signal is indicated in the timing chart of FIG. 4. The address generating part 11 generates the address 200 as an initial inside address signal Sia. Meanwhile, the processor 1 sequentially executes the calculation of each data u(0), u(1) . . . The processor 1 sends the address 100 as the outside address signal Sab to the address bus 5 and sends the data u(0) as the data signal Sdb to the data bus 6 at the end of the calculation cycle Pu0 of the data u(0). The comparator 12 compares the address 200 of the inside address signal Sia with the address 100 of the outside address signal Sab inputted via the address bus 5. Since the address signals do not coincide with each other at the end of the calculation cycle Pu0 of the data u(0), the coincidence signal Sco is not asserted (at the time t0 in FIG. 4). As a result, the write signal Srt from the control part 13 is not asserted, so that the buffer 14a and the address generating part 11 are not operated (the state maintained).

The same operation is carried out at the calculation cycle Pu1 of the data u(1) (at the time t1 in FIG. 4). At the end of the calculation cycle Pu2 of the data u(2), the processor 1 sends the address 200 as the outside address signal Sab to the address bus 5 and sends the data u(2) as the data signal Sdb to the data bus 6. The comparator 12 compares the address 200 of the inside address signal Sia with the address 200 of the outside address signal Sab. Since the addresses coincide with each other, the coincidence signal Sco is asserted to assert the write signal Srt from the control part 13 (at the time t2 in FIG. 4). As a result, the data u(2) is fetched from the data bus 6 and stored into the buffer 14a and the address generating part 11 proceeds to a next address (from 200 to 201). The same operation is carried out in the calculation cycle Pu3 of the data u(3) (at the time t3 in FIG. 4). Thereafter the data transfer is performed by sequentially writing the data u(4)–u(14) and u(18)–u(30) into the transfer region Rtr in the memory 2 in the same manner.

As described above, according to the first embodiment, the data to be sent-out of the processor 1 can be temporarily stored in the buffer 14a by comparing the addresses in the transfer control unit 3, thus achieving a high-speed date transfer. At this time, since the data can be transferred in the same manner as an I/O element installing a memory map, the system can be easily programed with an ordinary code in a processor for general purpose. Particularly high-speed operation is carried out with no interruption.

In the first embodiment, the calculation region Rcal and the transfer region Rtr are separated from each other in the memory 2. The regions may be overlapped each other. For instance, the final results of the data u(2)–u(14) are so programed to be respectively stored to the addresses 102–114 of the memory 2, and the address register 10 is so set that the address generating part 11 generates addresses 102–114 in order. This makes the transfer region Rtr unnecessary, thus saving the memory 2.

(SECOND EMBODIMENT)

There is another method for saving the memory 2, which is described in a second embodiment for the transfer control unit 3 using the control part 13 according to the present invention, with reference to the drawings.

Figure 5:
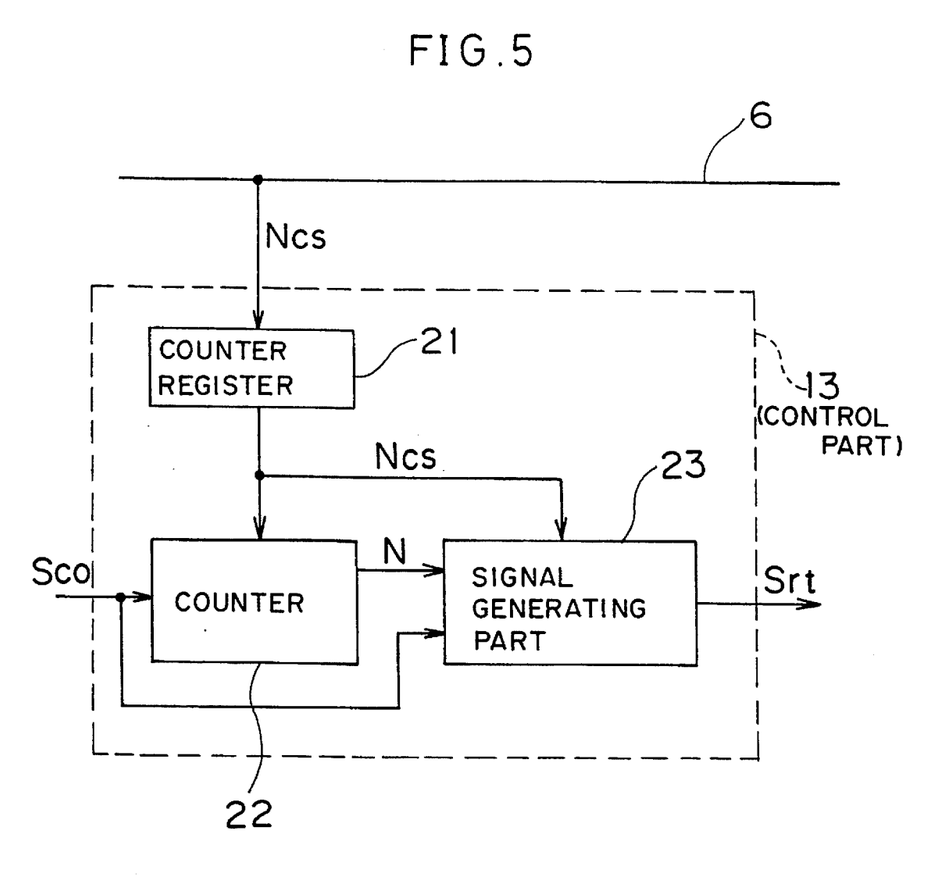
FIG. 5 is a block diagram showing a construction of a control part in a second embodiment.

FIG. 5 shows a construction of only the control part 13 of the transfer control unit 3 according to the second embodiment. The other construction of the transfer control unit 3 and the processor element 18 (not shown) are the same as in the first embodiment.

In FIG. 5, arranged in the control part 13 are a counter register 21 for setting a preset value Ncs of a counter 22 (described later), the counter 22 connected to the counter register 21 and the comparator 12 (see FIG. 1) for working according to the coincidence signal Sco from the comparator 12, and a signal generating part 23 connected to an output side of the counter 22 for generating the write signal Srt based on an output signal N from the counter 22 and the like.

Figure 6:
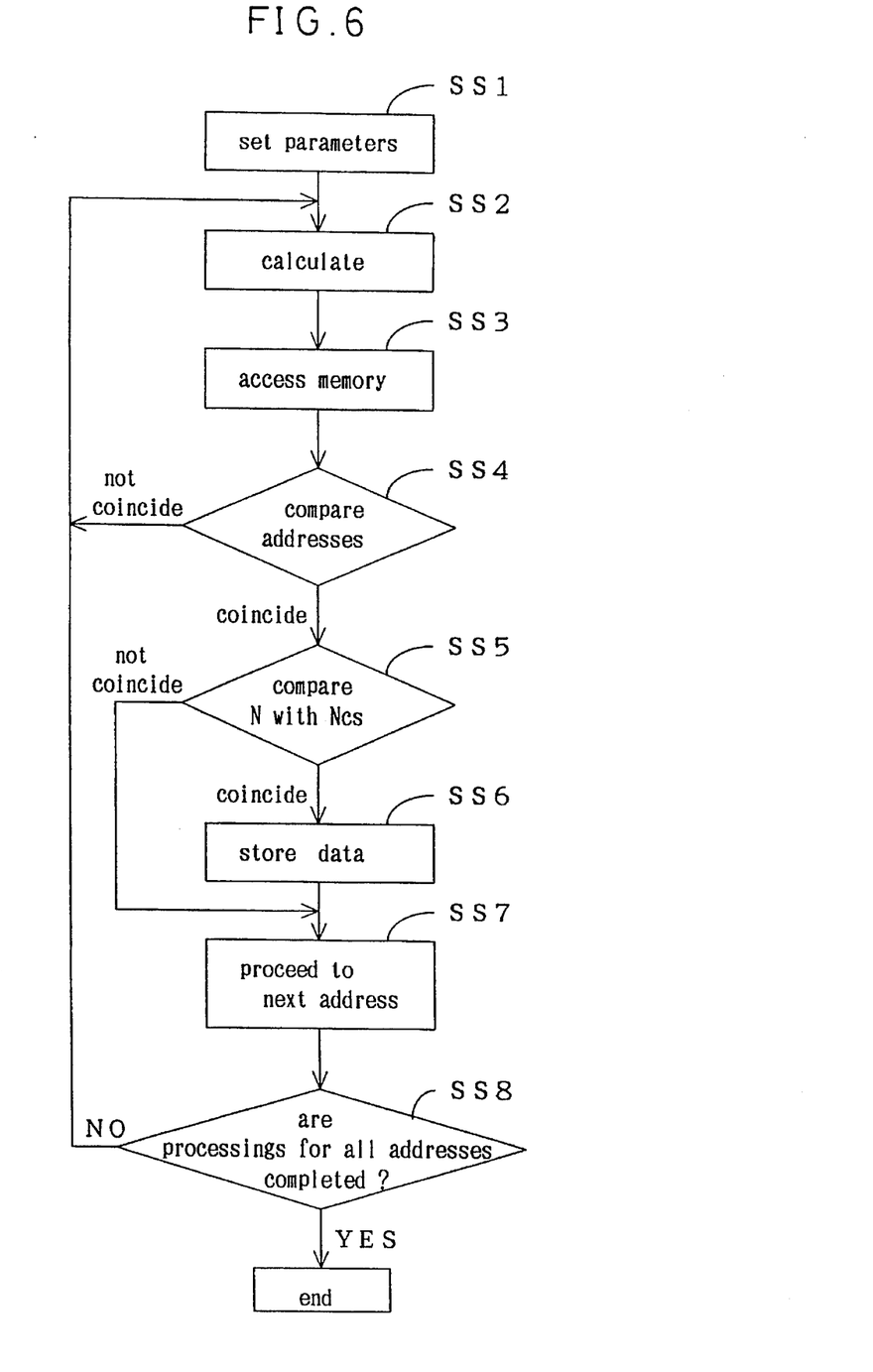
FIG. 6 is a flow chart illustrating a control flow in the second embodiment.
Figure 7:
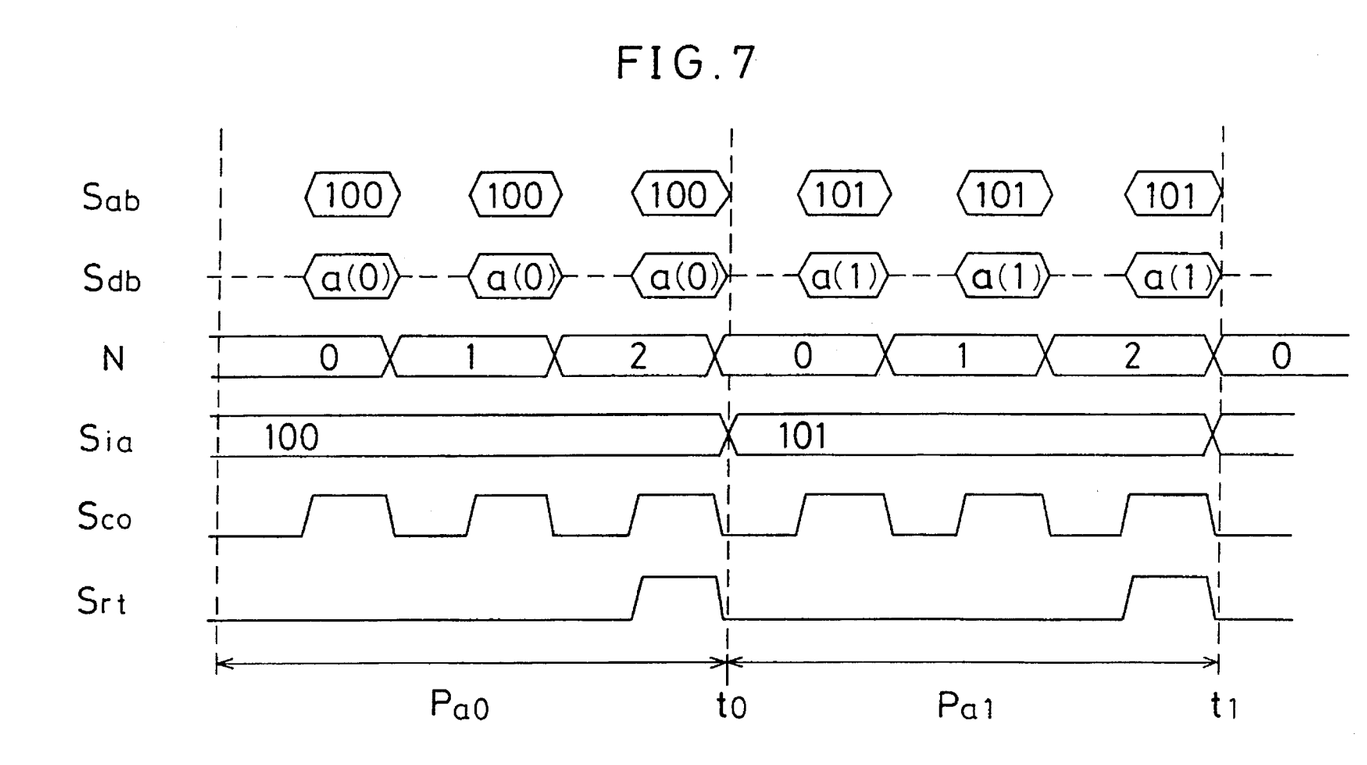
FIG. 7 is a timing chart of each signal in the second embodiment.

The operation of the transfer control unit 3 in the second embodiment, particularly the operation of the high-speed data transfer corresponding to that in the first embodiment is described, with reference to FIGS. 5–7.

The processor 1 performs at steps SS1–SS3 in FIG. 6 the same control as at steps ST1–ST3 in FIG. 3. Then a control is performed inside the transfer control unit 3 at steps SS4–SS7. In detail, the comparator 12 compares the inside address signal Sia with the outside address signal Sab to output the coincidence signal Sco at step SS4, then at step SS5, the counter 22 counts the receiving times N of the coincidence signal Sco and judges whether the count N is equal to the preset value Ncs in the counter register 21. When the count N reaches to the preset value Ncs, the counter is reset to 0.

On the other hand, the signal generating part 23 generates the write signal Srt, only when the count N of the counter 22 reaches to the preset value Ncs of the counter register 21 and the coincidence signal Sco is inputted from the comparator 12. Wherein, the write signal Srt may be outputted only when the count N reaches to the preset value Ncs with no coincidence signal Sco inputted from the comparator 12.

According to the outputted write signal Srt, the data on the data bus 6 is stored into the buffer 14a at step SS6. Concurrently therewith, the address generating part 11 and the counter 22 proceed to a next address according thereto at step SS7. Then at step SS8, judged is whether the processings for all addresses to be processed are completed. The control at step SS2 is repeated when the processings are not completed, and the control terminates when the processings for all addresses are completed. The data in the buffer 14a is sent outside from the port 15a thereafter.

The operation timing of the control part 13 and the like upon the above control is described with reference to FIG. 7. The address register 10 is so set beforehand that the address generating part 11 generates addresses in ascending order from the address 100 sequentially. The preset value Ncs is [2] in the counter register 21. This means that the data is transferred at every third time of the identical address accessed. Namely, when the preset value Ncs is set in the counter register 21, the data is transferred at every "Ncs+1"th time of access of the identical address. Wherein, the initial value of the inside address signal Sia is 100 and the initial count N of the counter 22 is 0. After the initial values are set, the calculation and the data transfer are started. The processor 1 sequentially calculates the data a(0), a(1) . . . and the calculation results are respectively stored to the addresses 100, 101 . . . in the memory 2 in ascending order.

As for the calculation cycle Pa0 of the data a(0), the processor 1 accesses the address 100 three times including the storage of the result. The coincidence signal Sco is asserted upon every access of address 100, and the count N of the counter 22 increases one by one. When the count N of the counter 22 reaches to the preset value Ncs and the coincidence signal Sco from the comparator 12 is asserted, the signal generating part 23 asserts the write signal Srt. According thereto, the data is fetched from the data bus 6 and stored into the buffer 14a and address generating part 11 proceeds to a next address (from 100 to 101). The counter 22 is reset to [0] after counting up to [2]. The same operation is carried out after the calculation cycle Pal of the data a(1).

As described above, according to the second embodiment, the data can be transferred at every set time of access of the identical address, which makes the transfer work region unnecessary even in case accompanying plural times of memory access at the calculation. Thus the memory 2 is saved.

We claim:

1. A transfer control unit which receives an address signal and a data signal from a first external unit via an address bus and a data bus, respectively, to transfer them to a second external unit, comprising:

a buffer for temporarily storing data;

an address register for being written to, from the first external unit via the data bus;

an address generating part, connected to the address register, for sequentially generating addresses of a memory in accordance with a written value of the address register;

a comparator for comparing an address generated in the address generating part with an address inputted from the first external unit via the address bus to output a coincidence signal when the addresses coincide with each other; and a controller, connected to the comparator, the buffer and the address generating part, for commanding the buffer to store the inputted data from the first external unit via the data bus and commanding the address generating part to proceed to a next address upon receipt of the coincidence signal output by the comparator, wherein said first external unit and said second external unit are external to said transfer control unit.

2. The transfer control unit according to claim 1, wherein the controller includes:

a counter which is connected to the comparator, which counts the number of times the coincidence signal is outputted from the comparator, and which is reset to an initial value when it counts up to a preset value; and a signal generating part, connected to the counter, the buffer, and the address generating part, for generating a signal for commanding the buffer to store the data from the first external unit via the data bus and commanding the address generating part to proceed to a next address when the count of the counter reaches to the preset value.

3. The transfer control unit according to claim 2, wherein the signal generating part is connected to an output side of the comparator, and the signal generating part commands the buffer to store the data from the first external unit via the data bus and commands the address generating part to proceed to a next address when a count of the counter reaches to the preset value and the coincidence signal from the comparator is received.

4. A processor element comprising a memory, a processor, and a transfer control unit which are connected to one another via an address bus and a data bus, wherein the transfer control unit includes:

a buffer for temporarily storing data;

an address register for being written to from an external unit via the data bus;

an address generating part, connected to the address register, for sequentially generating addresses in accordance with a written value of the address register;

a comparator for comparing an address generated in the address generating part with an address inputted from the external unit via the address bus to output a coincidence signal when the addresses coincide with each other; and a controller, connected to the comparator, the buffer and the address generating part, for commanding the buffer to store data input from the external unit via the data bus and commanding the address generating part to proceed to a next address upon receipt of the coincidence signal output by the comparator, wherein the processor is connected to the comparator of the transfer control unit, and the processor outputs an address signal to the comparator and writes a data into an address in the memory accessed by the address generating part and said memory and said processor are external to said transfer control unit.

5. The processor element according to claim 4, wherein a part of the memory serves as a transfer region, and the processor sets addresses corresponding to the transfer region to the address register of the transfer control unit, and writes a data into the transfer region at data transfer.

6. A method of transferring a data in a transfer control unit having a buffer for temporarily storing a data, an address register for being written to, from an external unit via the bus, an address generating part connected to the address register, for generating an address in accordance with a written value of the address register, and a comparator, comprising the steps of:

comparing an address generated in the address generating part with an address inputted from the external unit, said comparing performed by the comparator;

outputting a coincidence signal when the addresses coincide with each other, said comparator outputting the coincidence signal, and according to the coincidence signal, commanding the buffer to store data input from the external unit via the data bus and commanding the address generating part to proceed to a next address.

7. The method of transferring a data according to claim 6, wherein the commanding steps are carried out when a counter reaches to a preset value by counting the number of times the coincidence signal is received.

8. The transfer control unit according to claim 1, wherein the data bus of the first external unit is different from a data bus of the second external unit.

* * * * *